(12) United States Patent
Tay et al.

(10) Patent No.: US 8,873,396 B2
(45) Date of Patent: Oct. 28, 2014

(54) METHOD AND SYSTEM FOR CONGESTION MARKING

(75) Inventors: Hui Min J Tay, Ipswich (GB); Gabriele Corliano, Ipswich (GB); Philip L Eardley, Ipswich (GB); Robert J Briscoe, Woodbridge (GB)

(73) Assignee: British Telecommunications PLC, London (GB)

( * ) Notice: Subject to any disclaimer, the term of this patent is extended or adjusted under 35 U.S.C. 154(b) by 305 days.

(21) Appl. No.: 12/519,266

(22) PCT Filed: Dec. 18, 2007

(86) PCT No.: PCT/GB2007/004864
§ 371 (c)(1),
(2), (4) Date: Jun. 15, 2009

(87) PCT Pub. No.: WO2008/075029
PCT Pub. Date: Jun. 26, 2008

(65) Prior Publication Data
US 2009/0268614 A1 Oct. 29, 2009

(30) Foreign Application Priority Data
Dec. 18, 2006 (EP) .................................. 06256416

(51) Int. Cl.
*H04L 1/00* (2006.01)
*H04L 12/801* (2013.01)
*H04L 12/851* (2013.01)
*H04L 12/857* (2013.01)
*H04L 12/825* (2013.01)
*H04L 12/835* (2013.01)
*H04L 12/833* (2013.01)
*H04L 29/08* (2006.01)

(52) U.S. Cl.
CPC ................ *H04L 47/10* (2013.01); *H04L 47/11* (2013.01); *H04L 47/12* (2013.01); *H04L 47/245* (2013.01); *H04L 47/2491* (2013.01); *H04L 47/26* (2013.01); *H04L 47/30* (2013.01); *H04L 47/31* (2013.01); *H04L 47/33* (2013.01); *H04L 69/32* (2013.01)
USPC ......... 370/236; 370/230; 370/230.1; 370/237

(58) Field of Classification Search
None
See application file for complete search history.

(56) References Cited

U.S. PATENT DOCUMENTS 6,426,944 B1 * 7/2002 Moore .......................... 370/236
6,826,620 B1 * 11/2004 Davis et al. ................... 709/235
(Continued)

OTHER PUBLICATIONS
International Search Report for PCT/GB2007/004864, mailed Feb. 6, 2008.

*Primary Examiner* — Kibrom T Hailu
*Assistant Examiner* — Zewdu A Beyen
(74) *Attorney, Agent, or Firm* — Nixon & Vanderhye PC

(57) ABSTRACT

The present invention provides a method and system wherein congestion information is taken from a lower level in the protocol stack and used for congestion marking in a higher layer. In particular, the method and system of the invention from a first aspect provide for congestion information in the lower layer to be generated downstream at a congested node, and to be fed back upstream to a source node. The source node then passes the congestion information, or information derived therefrom, up to the corresponding network element responsible for higher layer functions in the protocol stack, where higher level congestion marking can then be performed in dependence on the received lower level congestion information. Thus, congestion information from the lower layer which can typically be generated earlier before significant congestion occurs can be used in higher layer congestion control functions. Preferably the lower layer is the data link layer, and the higher layer is the network layer.

18 Claims, 12 Drawing Sheets

(56) References Cited

U.S. PATENT DOCUMENTS

| | | |
|---|---|---|
| 2001/0055313 A1 | 12/2001 | Yin et al. |
| 2003/0126286 A1 | 7/2003 | Lee |
| 2005/0147032 A1* | 7/2005 | Lyon et al. .................... 370/229 |
| 2006/0104298 A1* | 5/2006 | McAlpine et al. ............. 370/412 |
| 2006/0203730 A1* | 9/2006 | Zur ............................... 370/235 |
| 2007/0053294 A1* | 3/2007 | Ho et al. ........................ 370/235 |
| 2007/0081454 A1* | 4/2007 | Bergamasco et al. ......... 370/229 |
| 2007/0291643 A1* | 12/2007 | Charny et al. ................. 370/230 |

* cited by examiner

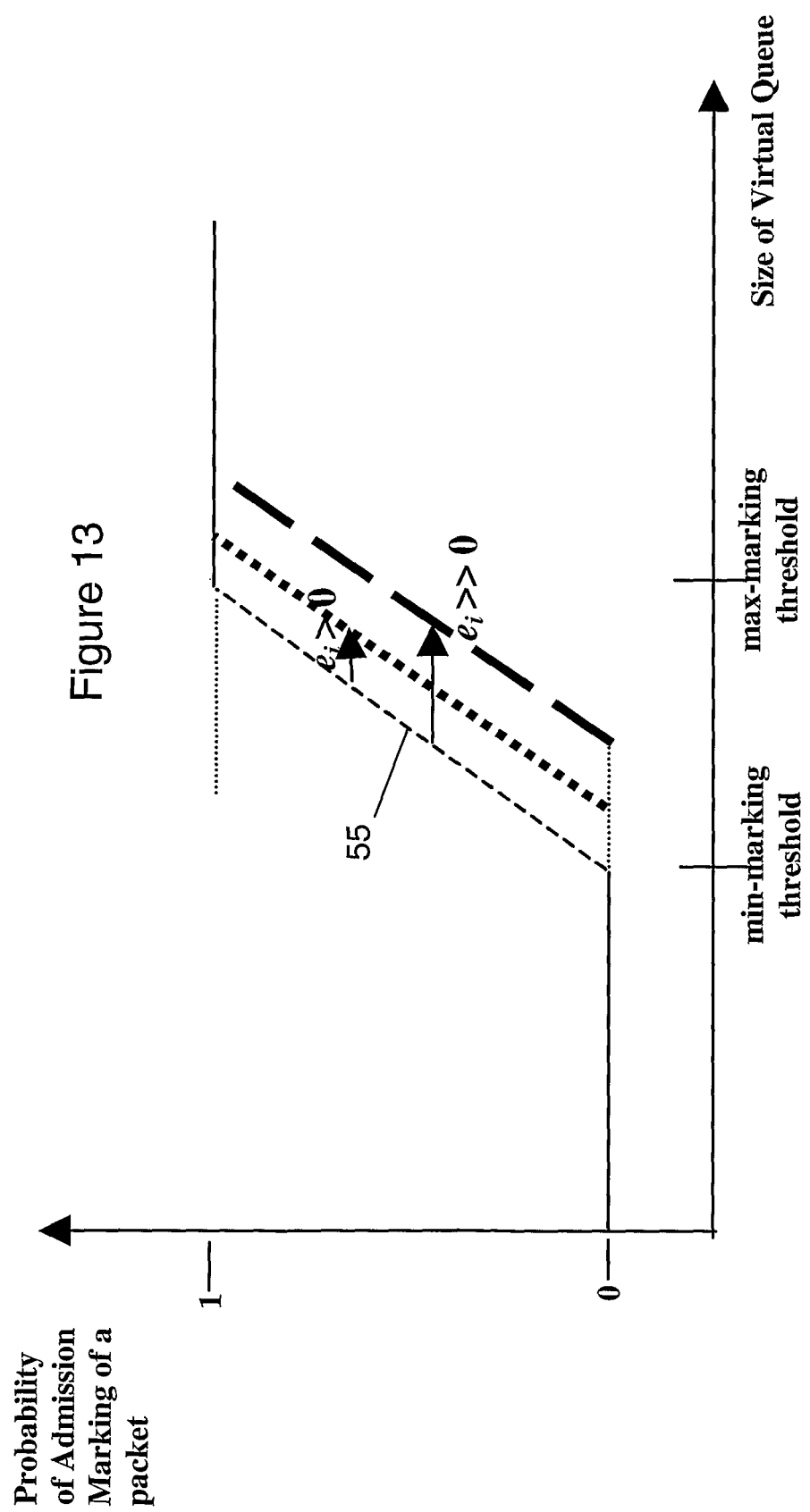

METHOD AND SYSTEM FOR CONGESTION MARKING

This application is the U.S. national phase of International Application No. PCT/GB2007/004864 filed 18 Dec. 2007, which designated the U.S. and claims priority to European Application No. 06256416.6, filed 18 Dec. 2006, the entire contents of each of which are hereby incorporated by reference.

TECHNICAL FIELD

The present invention relates to packet switched data networks, and in particular to a method and system for congestion marking data packets in a higher layer in the protocol stack, based upon congestion information obtained from a lower layer in the stack.

BACKGROUND TO THE INVENTION

"Congestion Marking" in data networks is the practice of setting a certain value in a particular field in a packet header to indicate that the packet has experienced congestion at a hop in a network as the packet traverses the network as part of a flow. If the packet continues to experience congestion at a later hop, then the router at the later hop can decide to drop the congestion marked packet, to alleviate congestion within the network as a whole. Congestion marking in Internet Protocol (IP) networks is well known, and typically operates by the network layer router "marking" a packet (in the IP header) when traffic is above a certain threshold. In particularly, IETF RFC 3168 defines the addition of ECN (Explicit Congestion Notification) to IP, making use of the DiffServ Codepoint (DSCP) in the IP header to perform the ECN marking.

The use of congestion marking allows various network control functions to be performed, such as: (1) congestion reactive protocols such as TCP: to perform rate control instead of discarding the packet; (2) PCN (Pre-Congestion Notification): to control admission of new flows and pre-empt existing flows; and (3) Traffic Engineering: control shifting of flows to alternate paths.

ECN techniques typically rely on congestion having occurred at some point in the network in order to trigger the initial ECN marking of packets, and then further congestion occurring to cause ECN marked packets to be dropped. However, in some deployments it may be better to try and detect increasing network traffic and to take remedial action to control the network load before congestion actually occurs, or just as it is starting to occur. To try and address such issues the concept of Pre-Congestion Notification (PCN) has been developed, for use in the context of network layer congestion marking.

PCN (Pre-Congestion Notification) is an End-to-End Controlled Load (CL) Service using Edge-to-Edge Distributed Measurement-Based Admission Control (DMBAC) described in IETF Internet draft Briscoe et al, "*An edge-to-edge Deployment Model for Pre-Congestion Notification: Admission Control over a DiffServ Region*", draft-briscoe-tsvwg-cl-architecture-04.txt, available from http://tools.ietf.org/wg/tsvwg/draft-briscoe-tsvwg-cl-architecture-04.txt, and IETF Internet draft B. Briscoe et al, "*Pre-Congestion Notification Marking*" "draft-briscoe-tsvwg-cl-phb-02.txt", available from http://www.ietf.org/internet-drafts/draft-briscoe-tsvwg-cl-phb-03.txt. The main objective of MBAC (measurement based admission control) is to guarantee Quality of Service (QoS) requirements, not only for any incoming flow examined for admission, but also for existing admitted flows.

PCN uses two control algorithms: Flow Admission Control and Flow Pre-emption. These are described in more detail below. For further detail reference is made to the two IETF Internet drafts noted above, which are incorporated herein by reference.

In Flow Admission Control, PCN introduces an algorithm that "Admission Marks" packets before there is any significant build-up of CL packets in the queue. Admission marked packets act as an early warning that the amount of packets flowing is close to the engineered capacity. The CL service is achieved "edge-to-edge" across the CL-region, by using DMBAC (Distributed Measurement-Based Admission Control). The decision to admit a new flow depends on measurement of the existing traffic between the same pair of ingress and egress gateways. The CL-region egress calculates the fraction of packets that are marked using a EWMA (Exponential Weighted Moving Average), and reports the value (Congestion Level Estimate) back to the ingress.

Admission marking is performed as follows. In the current PCN design, the router computes the probability that the packet should be admission marked according to the size of the virtual queue at the router, using the following RED-like algorithm:

Size of virtual queue<min-marking threshold,probability=0;

min-marking-threshold<size of virtual queue<max-marking-threshold–min-marking-threshold), probability=(Size of virtual queue–min-marking-threshold)/(max-marking-threshold–min-marking-threshold);

Size of virtual queue>max-marking threshold,probability=1.

This gives a probability function as shown in FIG. 3, with a linearly increasing probability of a packet being marked dependent on the virtual queue size at the router, between the minimum and maximum marking thresholds. In this respect, by "virtual queue" we mean a simulation of the size of the traffic queue at the router, but which is adapted to simulate a slower sending rate (i.e. rate at which the queue empties) than actually occurs for real. Thus, the "virtual queue" is a number which is incremented at the same rate as the arrival of packets at the real queue, but is decremented at a slower rate than the real queue is actually emptied due to actual packets being sent from the real queue. For example, the rate of decrement of the virtual queue may be chosen to be some percentage, say 80%, of the actual router sending rate and hence rate of decrement of the real queue.

The effect of using this slower virtual "sending rate" (i.e. rate at which the virtual queue is decremented) is that it allows potential congestion to be detected earlier than would otherwise be the case by simply looking at the amount of data queued in the real queue. For example, if one looked at the real queue, and was to wait until the real queue was full to detect and then take action against congestion, then in fact congestion has already occurred and packets are being lost due to buffer overflow before remedial action is undertaken. However, by looking at the virtual queue, because the virtual sending rate (i.e. rate at which the virtual queue counter is decremented) is less than the actual sending rate, then for a given packet arrival rate the virtual queue will always be more "full" (i.e. indicate a higher level) than the actual queue. If the packet arrival rate increases such that the virtual queue "overflows" (i.e. reaches a threshold number, which may be equal to the number of packets which the real queue may hold), then this is an indication that congestion may be about to occur in the real queue, and action can be taken. Of course, as the real queue has a higher sending rate than the virtual queue, at the point where the virtual queue overflows the real queue will still have capacity, and hence congestion will not in fact have yet occurred. Thus, the technique of using a virtual queue provides a mechanism by which early detection of potential congestion can take place.

Flow Pre-emption is a scheme that helps to cope with failures of routers and links. New flows are only admitted if there is sufficient capacity, such that the QoS requirements of the new flows and existing admitted flows can be met. The traditional methods of taking into account link failure, mitigation and re-routing, can cause severe congestion on some links, and degrade QoS experienced by on-going flows and other low-priority traffic. PCN uses rate-based flow pre-emption, so that a sufficient proportion of the previously admitted flows are dropped to ensure that the remaining ones again receive QoS commensurate with CL service, and at least some QoS is quickly restored to other traffic classes. The steps to do Flow Pre-emption are: (1) Trigger the ingress gateway to test whether pre-emption may be needed. A router enhanced with PCN may optionally include an algorithm that pre-emption marks packets. Reception of packets thus marked at the egress sends a Pre-emption Alert message to the ingress gateway. (2) Calculate the right amount of traffic to drop. (3) Choose which flows to send. (4) Tear down reservation for the chosen flows. The ingress gateway triggers standard tear-down messages for the reservation protocol in use. Again, further details of Flow pre-emption are given in the IETF drafts referenced above.

It should be noted that in any deployment of PCN only one or other of flow admission control or flow pre-emption may be used, or both control algorithms may be used. In terms of the PCN marking of packets, admission control marks would be used by the admission control algorithm, and pre-emption marks by the flow pre-emption algorithm. Encoding of admission control marks and pre-emption marks into the DSCP is described in B. Briscoe et al, "*Pre-Congestion Notification Marking*" "draft-briscoe-tsvwg-cl-phb-02.txt", referenced above.

ECN and PCN are network layer (Layer 3 in the OSI model) protocols, used by network routers for congestion control at the network layer. However, it has recently been proposed to introduce congestion signalling into the data link layer (Layer 2 in the OSI model), to allow a data link layer entity, such as an Ethernet switch, to perform rate control in response to received congestion signals. In particular, a technique known as Backward Congestion Notification (BCN) has recently been proposed for use over Ethernet in datacenter networks.

Backward Congestion Notification (BCN) is a mechanism for datacenter networks (DCNs) that was initially developed by Davide Bergamasco at Cisco Systems, and is presently being looked at by the IEEE802.1/802.3 standards committees. BCN allows congestion feedback (at layer 2 only) from a congestion point (up to several hops away) and rate control at the ingress. It is described in JinJing Jiang, Raj Jain and Manoj Wadekar, *Analysis of Backward Congestion Notification (BCN) for Ethernet in Datacenter Applications*, submitted to 14th International IEEE Conference on Networking Protocols (ICNP 2006), Santa Barbara, Calif., Nov. 12-15, 2006, available at http://www.cse.ohio-state.edu/~jain/papers/bcn.htm, and also in the original IEEE presentation given by Bergamasco at the IEEE 802.1 Interim Meeting held in Berlin, Germany, 12 May 2005, and available at http://www.ieee802.org/1/files/public/docs2005/new-bergamasco-backward-congestion-notification-0505.pdf. A brief overview of the operation of BCN is given below.

BCN messages use the IEEE 802.1Q tag format, and the key fields in the BCN message are shown in FIG. 2

A BCN message 30 comprises the following fields. The DA (destination address) 31 of the BCN message denotes the SA (source address) of the sampled frame. The SA (source address) 34 of the BCN message denotes the MAC address of the Congestion Point. The CPID 35 is a congestion point identifier. Field $e_i$ 33 gives information about the buffer that is fed back to the source. E.g., from FIG. 1, switch 4 may send a BCN message back to switch 1 (SA, source address of sampled frame), indicating the congestion level at the ingress to switch 4 (which the sampled frame traverses). The field 32 is used to indicate the type of the tag message, i.e. that it is a BCN message. The field C 36 is used to signal the capacity of the congested link.

The field "$e_i$" 33 in the BCN message gives some information about the condition of the memory buffer of the Ethernet switch which generated the BCN message. The value consists of a weighted sum of the instantaneous queue offset and the queue variation over the last sampling intervals, as shown in Equation 1 below:

$$e_i = q_{off}(t) - Wq_{delta}(t) = (Qeq - q(t)) - W(q_a - q_d) \qquad \text{Eq. 1}$$

where W is the weight; $q_{off}(t)$ is the instantaneous queue offset defined as $$q_{off}(t) = q(t) - Q_{eq} \qquad \text{Eq. 2}$$

and $q_{delta}$ is the queue variation over the last sampling interval and is defined as the difference in the number of packets that arrived $q_a$ and the number of packets that were served $q_d$ since the last sampling event. Here, q(t) is the instantaneous actual queue size, and $Q_{eq}$ is the equilibrium queue size, which would typically be half the total size of the queue.

If $e_i$>0, it indicates that the BCN message is positive. It means there is less potential of congestion soon. $e_i$>0 will be set when either one of the conditions below is met:
 1. when the queue length is short and queue is not increasing; or
 2. even though the queue length is large at the moment, it is decreasing and so the sources are encouraged to increase their rates If $e_i$<0, it indicates that the BCN message is negative. It means there is more potential of congestion soon. $e_i$<0 will be set when either one of the conditions below:
 1. Even though the queue is small at the moment, it is increasing and so sources are encouraged to decrease their rates;
 2. The large queue indicates the link is congested. The sources are asked to decrease their rates Upon receiving a BCN message, the source adjusts its rate using an additive increase, multiplicative decrease (AIMD) algorithm, which uses $e_i$ as a parameter. Further details are available in the Jiang et al. paper referenced above.

BCN therefore provides a congestion signalling and sending rate adaptation scheme for use in Ethernet networks, and which can be used to avoid long delays, and minimise loss in layer 2 Ethernet networks. On the other hand, PCN has been proposed to provide for congestion control in the network layer, by virtue of PCN marks being applied to packets then being used to trigger admission control algorithms to prevent admission of new flows when the network reaches its engineered load, and/or flow pre-emption algorithms to "preempt", or terminate, existing admitted flows in the event of router or link failure. To date, however, as shown in FIG. 1, the two schemes, operating as they do in different layers of the protocol stack, have been intended to operate independently from each other, each in its own layer. In this respect, FIG. 1 illustrates how BCN can operate in the data link layer 10 to send BCN messages backwards in the upstream direction from an Ethernet switch which is experiencing congestion to the source switch, whereas PCN can operate separately in the network layer 20.

No interaction between the two mechanisms has heretofore been envisaged. Nevertheless, each mechanism is effectively acting to detect and act upon the same deleterious phenomenon i.e. congestion in the network. Moreover, PCN attempts to avoid congestion completely by detecting when a network is reaching its engineered capacity, and taking action at the network layer, typically in the form of admission control, in response thereto. Therefore, early congestion detection in PCN is useful to attain this objective. However, IP packets in the network layer must be transmitted over a link using the data link layer, and it is in the data link layer traffic queues that congestion will first occur. Therefore, congestion will typically be detectable earlier by monitoring the data link layer traffic queues, as is done by BCN. It would therefore be advantageous to be able to take the earlier congestion detection which is available in a data link layer congestion protocol and feed the congestion indication up into the network layer, such that earlier remedial action can also be then taken in the network layer. More generally, such advantages would also be obtained from taking congestion information from a lower layer in the protocol stack, for use in a higher layer.

PRIOR ART

IP packets can be encapsulated for switching purposes within one or more MPLS labels, for transport via an MPLS network. In such a case the IP layer effectively treats the MPLS layer as its link layer, but in reality MPLS will often lie on top of a true data link layer, such as PPP. In this respect, as acknowledged in the art (see e.g. Tanenbaum, A. S. *Computer Networks* 4*th* ed, Pearson Education, 2003. at p. 416), MPLS can be thought of as Layer 2.5. In view of this, in IETF Internet draft B. Davie, B. Briscoe, and J. Tay, *Explicit Congestion Marking in MPLS*, "draft-davie-ecn-mpls-01.txt", available from: http://www.cs.ucl.ac.uk/staff/B.Briscoe/proiects/ipe2egos/ggs/papers/draft-davie-ecn-mpls-01.html it is described how ECN marking can be performed in MPLS label headers. In particular it is described that as a packet traverses an MPLS network the MPLS labels can be congestion marked if congestion is experienced. When the last MPLS label has been popped from the MPLS label stack to reveal the IP packet header (typically at the egress of the MPLS network) then any congestion mark in the MPLS label is copied into the DSCP in the IP header. Thus, with such a scheme, congestion information is taken from a layer below the network layer, being the MPLS layer, and used for congestion marking within the network layer. However, as discussed, MPLS is not a true data link layer protocol, instead being directed at providing simpler switching, and requires another data link layer protocol underneath to perform the actual data transmission between switches. Thus feeding congestion information derived from MPLS into IP does not provide the same early congestion detection as can be obtained from congestion information obtained within the real link layer from looking at the link layer traffic queues.

Referring now to prior patent documents, United States application US 2006/104298 ("McAlpine et al") relates to congestion control, and to controlling the rate of data transmission between nodes based on traffic congestion in a communication path between the nodes. In particular, it discloses a source node which receives related frames of data to be transmitted from the source node to a destination node, and places the frames in a queue. The queue is associated with a communication path over which the related frames are to be transmitted to the destination node. An interface that couples the source node to the communication path receives an indication directed to the source node of traffic congestion in the communication path. In response, the source node controls the rate at which the related frames of data are transferred from the queue to a transmit buffer accessible to the interface, in order to relieve traffic congestion in the communication path.

Further to this, U.S. Pat. No. 6,426,944 ("Moore") relates to a method and apparatus for controlling data messages across a fast packet network. In particular, it discloses how a high-speed packet network may control data flow through the network more efficiently using forward and/or backward explicit congestion notification messages (FECN and BECN) to throttle data transmission between network elements. The network includes a router for initiating a data flow control comprised of a receiving protocol stack, a controller and an operating system. The router controller is programmed to respond to receipt of a congestion message (BECN) from a fast packet network such as a frame relay or cell relay network to generate a pass-through packet message requesting the opening of a virtual data flow control channel between layer N and layer N+2, where layer N may be layer 2 of a frame relay protocol and layer N+2 may be layer 4 of a TCP protocol. Layer 4 may refuse to open the channel, but once a channel is opened, data flow control may be initiated between destination intelligent terminals when congestion is sensed in the fast packet network. The router controller is also programmed to open a path to the data source and to signal to the data source that data presentation rates should be modulated.

SUMMARY OF THE INVENTION

In view of the above, embodiments of the present invention provide methods and systems wherein congestion information is taken from a lower level in the protocol stack and used for congestion marking in a higher layer. In particular, the method and system from a first aspect provide for congestion information in the lower layer to be generated downstream at a congested node, and to be fed back upstream to a source node. The source node then passes the congestion information, or information derived therefrom, up to the corresponding network element responsible for higher layer functions in the protocol stack, where higher level congestion marking can then be performed in dependence on at least the received lower level congestion information. Thus, congestion information from the lower layer which can typically be generated earlier before significant congestion occurs can be used in higher layer congestion control functions.

From another aspect the method and system of embodiments of the invention provide for congestion information from the data link layer to be passed to the network layer, and for congestion marking of packets in the network layer to be performed in dependence on the data link layer congestion information. Preferably the data link layer congestion information has been generated in dependence on one or more properties of a virtual queue maintained at least one data link layer node. By looking at the data link layer virtual queues, earlier detection of potential congestion can be obtained, which can then be used by the network layer for congestion marking such as pre-congestion marking, to trigger control algorithms to attempt to avoid any congestion occurring. In other embodiments, rather than using a virtual queue, the data link layer congestion information can be generated in dependence on the level of the real traffic queue maintained at least one data link layer node.

In view of the above, there is disclosed a method for determining congestion information in a data network, comprising the steps: receiving, at an upstream element having a lower layer in the protocol stack in respect of a data flow, lower layer congestion information relating to data traffic congestion occurring at a downstream element in the flow, the downstream element being within the same layer; and providing at least a part of the lower layer congestion information, or further information derived therefrom, to an element at a higher layer in the protocol stack. Thus, a lower layer network element can be modified to permit for the sending of lower layer congestion information which provides for an early warning of congestion into a higher layer.

Optionally, the method may further comprise adapting the data flow in response to the lower layer congestion information. This would allow both rate adaptation to be performed at the lower layer as well as congestion control at the higher layer, to provide two mechanisms to combat congestion.

According to one aspect the invention provides a method of determining congestion information in a data network, comprising the steps: receiving, at an upstream element having a higher layer in the protocol stack, lower layer congestion information from a network element at a lower layer in the stack, the congestion information relating to data traffic congestion occurring at a downstream element in the flow, the downstream element being within the lower layer; determining higher layer congestion information to be used in the higher layer, in dependence on the lower layer congestion information; and applying the higher layer congestion information to data traffic in the higher layer. As a result, a higher layer congestion control scheme can incorporate information from a lower layer, thus allowing for congestion control to be performed earlier than may otherwise be the case.

In preferred embodiments the lower layer is the data link layer, and the higher layer is the network layer.

From, another aspect the invention also provides a method for use in congestion marking in a data network, comprising the steps: determining, at a data link layer network element, data link layer congestion information relating to congestion occurring within one or more data link layer links in said network; and passing said data link layer congestion information to a network layer network element. Thus, congestion information specific to the data link layer can be fed into the network layer, where it can then be used for early congestion control.

Similarly, therefore, the invention further provides a method of congestion marking in a data network, comprising the steps: receiving, at a network layer network element, data link layer congestion information relating, to congestion occurring within one or more data link layer links in said network; determining network layer congestion information in dependence on the received data link layer congestion information; and applying said determined congestion information to one or more data packets in the network layer. The network layer can then use the information from the data link layer, to perform congestion control earlier than would otherwise be the case.

Preferably, the data link layer congestion information is determined in dependence on the size of a virtual queue maintained at the downstream data link layer network element. In other embodiments, however, the data link layer congestion information is representative of the level of queued data in the actual data link layer traffic queue at the downstream data link layer network element. Thus congestion in the form of large queues can be detected as early as possible.

In preferred embodiments the data link layer congestion information is in the form of BCN information, and the network layer congestion information is in the form of PCN marks. Such features make embodiments of the present invention particularly attractive for deployment in IP-over-Ethernet networks.

Where PCN is used, preferably the PCN marks are admission marks if the data link layer congestion information indicates congestion between a first predetermined threshold value and a second, higher, predetermined threshold value, and pre-emption marks above said second predetermined threshold value. Thus, whether the admission control or flow pre-emption control algorithms of PCN are invoked will depend on the amount of congestion in the data link layer.

In preferred embodiments the network layer congestion information is determined in dependence on a probability function with respect to virtual queue size in the network layer element, wherein the probability function is adapted in dependence on the data link layer congestion information. Adaptation of the marking probability function allows for relatively straightforward translation of the data link layer congestion information into the network layer congestion information.

Alternatively, the network layer congestion information is determined in dependence on the data link layer congestion information in such a manner that substantially the same amount of payload data is congestion marked in the network layer as in the data link layer. Such a feature provides that the network layer does not overreact or under-react to the congestion experienced in the data link layer by congestion marking more or less data in the network layer as experienced congestion in the data link layer.

There is also disclosed a network element within a lower layer in the protocol stack for determining congestion information in a data network, comprising: a first interface at which is received lower layer congestion information relating to data traffic congestion occurring at another downstream element in the flow, the downstream element being within the same layer; and a second interface adapted to forward at least a part of the lower layer congestion information, or further information derived therefrom, to an element at a higher layer in the protocol stack.

Optionally, the network element may further comprise a flow adapter arranged to adapt the data flow in response to the lower layer congestion information.

Additionally the present invention provides a network element at a higher layer in a protocol stack for determining congestion information in a data network, comprising: an interface for receiving lower layer congestion information from a network element at a lower layer in the stack, the congestion information relating to data traffic congestion occurring at a downstream element in the flow, the downstream element being within the lower layer; and a control element arranged in use to: i) determine higher layer congestion information to be used in the higher layer, in dependence on the lower layer congestion information; and ii) apply the higher layer congestion information to data traffic in the higher layer.

Moreover the present invention also provides a data link layer network element comprising a congestion controller arranged to determine data link layer congestion information relating to congestion occurring within one or more data link layer links in said network; and an interface for passing said data link layer congestion information to a network layer network element.

Finally the present invention further provides a network layer network element comprising: an interface for receiving from a data link layer element data link layer congestion information relating to congestion occurring within one or more data link layer links in said network; and a control element arranged in use to: i) determine network layer congestion information in dependence on the received data link layer congestion information; and ii) apply said determined congestion information to one or more data packets in the network layer.

BRIEF DESCRIPTION OF THE DRAWINGS

Further features and advantages of the present invention will become apparent from the following description of embodiments thereof, presented by way of example only, and by reference to the drawings, wherein like reference numerals refer to like parts, and wherein:—

FIG. 13 is a graph illustrating the probability function of admission marking a packet in an embodiment of the invention.

DESCRIPTION OF EMBODIMENTS OF THE INVENTION

Figure 1:
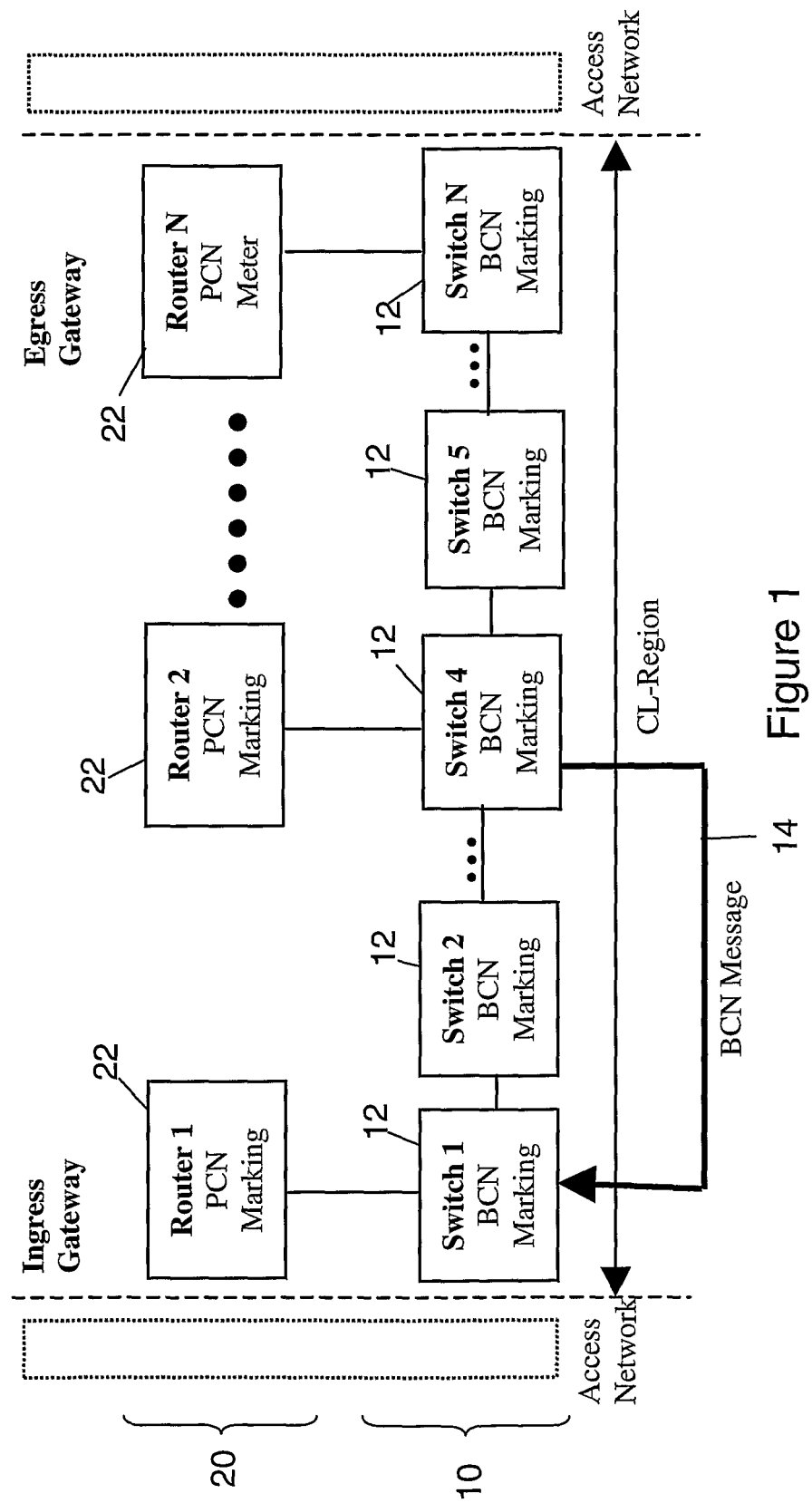
FIG. 1 is a diagram illustrating how BCN marking and PCN marking may be used in the prior art.

Embodiments of the present invention will now be described with respect to the drawings.

As noted previously, FIG. 1 illustrates typical network elements, in terms of a plurality of routers 22 provided in the network layer 20, and a plurality of switches 12 forming the links between routers 22, in the data link layer 10. Packets from higher layers access the core network via an access network, and are fed to the ingress gateway shown as router 1 in the controlled load region of the network. Router 1 determines the routing for the received packets, and passes the packets to its associated data link layer switch, in this case switch 1, for transmission to the next hop router in the network layer. The next hop between router 1 and router 2 in the network layer may comprise several individual data links, formed from switches 1 to 4 in the data link layer 10. Typically, the data link layer may comprise an Ethernet, or the like.

At the data link layer the network layer packets are encapsulated into data link layer frames, such as Ethernet frames, for transmission from switch to switch in the data link layer to the intermediate network router, in this case router 2. As previously discussed, congestion marking such as, for example, PCN, can be undertaken in the network layer, and used to perform admission control and flow pre-emption. Additionally, it is also known that congestion marking may be performed in the data link layer, for example using BCN, in order to identify congestion within a particular switch in the data link layer, and control a source node to adapt its data transmission rate to accommodate the congestion. In FIG. 1 an example BCN message 14 is shown being transmitted back from switch 4 associated with the intermediate router, router 2, to switch 1 associated with the ingress router, router 1. However, as discussed, within the prior art the BCN and PCN mechanisms are effectively separate, with no integration therebetween. Thus, within FIG. 1 whereas switch 1 might adapt its transmission rate in response to the BCN message, no additional PCN marking would be undertaken of packets at the network layer, in response to the congestion detected at the data link layer.

Figure 4:
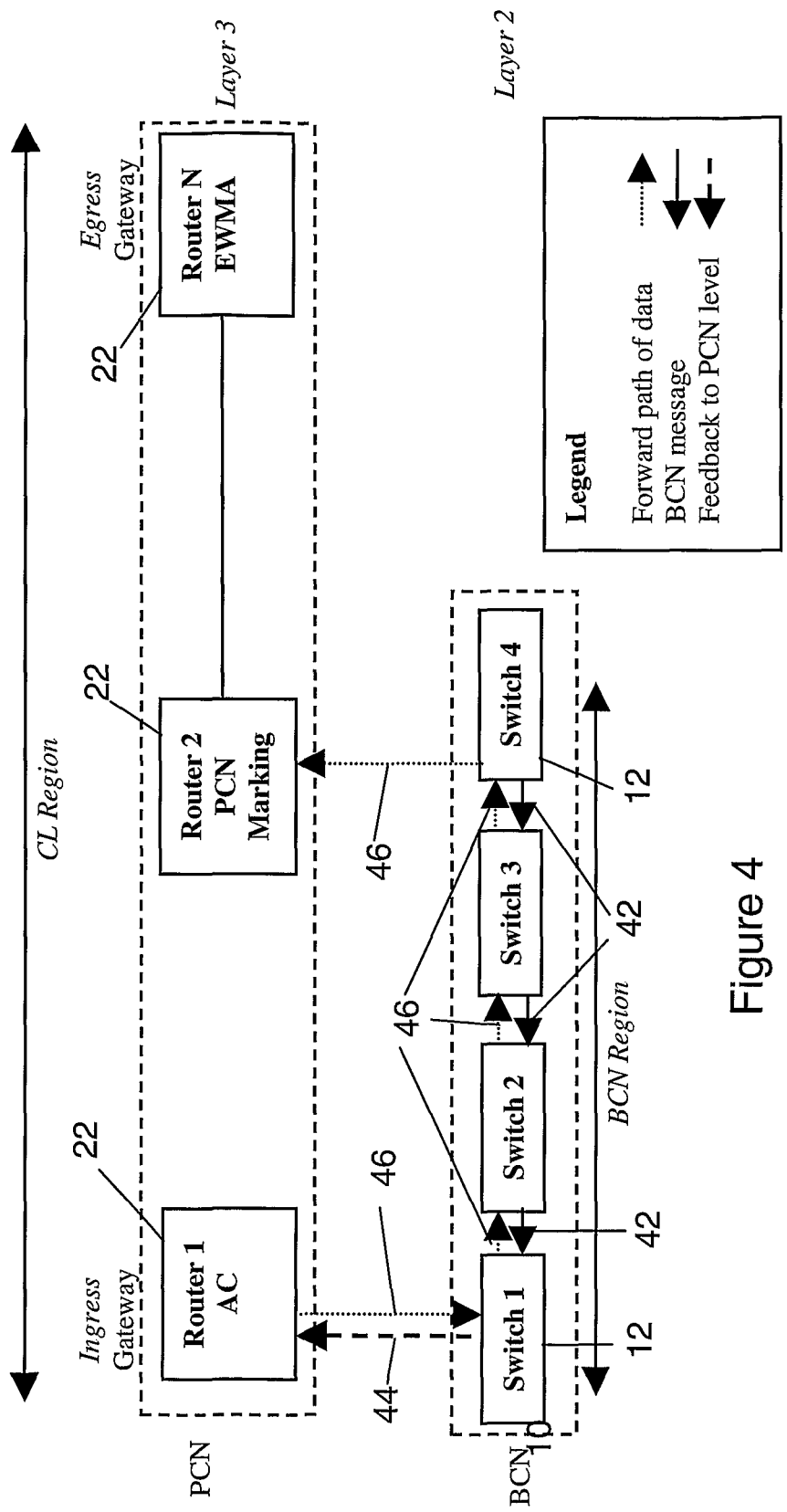
FIG. 4 is a diagram illustrating the network elements and data flows involved in a first embodiment of the present invention.

A first embodiment of the present invention is shown in FIG. 4. Within the first embodiment congestion information contained at a data link layer switch by virtue of the receipt of a BCN message is fed back to the switch's corresponding network layer router, so that the data link layer congestion information can be taken into account in the congestion notification marking of packets in the network layer. FIG. 4 illustrates this mechanism operating to feed back data link layer congestion information to the ingress router 22, being router 1, which performs admission control at the network layer. More particularly, as described the ingress router 1 receives, via an access network (not shown), data to be transmitted over the controlled load region of a network. As shown by arrows 46 representing the forward path of the flow of data packets, having decided how to route the received packets the packets are passed from the network layer to the data link layer, typically an Ethernet network or the like, wherein switch 1 then begins the process of transmitting the flow of packets across multiple individual data links towards the next intermediate router 2. More particularly, in this example router 1 is connected to router 2 via three data link layer hops, between switch 1 and switch 2, switch 2 and switch 3, and switch 3 and switch 4. At switch 4 which is associated with the intermediate router 2, the IP packet is de-encapsulated from the data link layer frame, and passed to the router 2, for onward routing.

Figure 2:
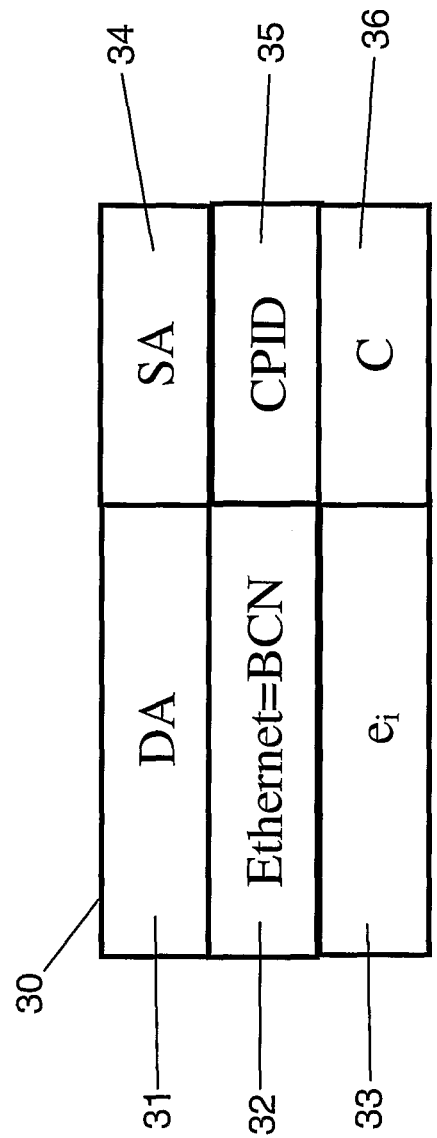
FIG. 2 is a diagram illustrating the format of a BCN message as used in the prior art.

Consider now that congestion is experienced in the data link layer at switch 4, which operates a congestion marking mechanism such as BCN (together with switches 1, 2 and 3). Switch 4 then generates a BCN message in the format described previously with respect to FIG. 2, with the address of switch 1 as the destination address. The source address in field 34 is given as the MAC address of the congestion point, being switch 4. The BCN mechanism in switch 4 calculates the congestion information value $e_i$ which is placed into field 33 of the BCN message. The congestion information value in the present embodiment may be calculated as described previously with respect to the prior art BCN mechanism, or may alternatively be calculated in dependence on a virtual queue maintained at the switch 4, as will be described later. The capacity of switch 4 is also placed in field 36. The BCN message is then transmitted backwards upstream of the packet flow, to switch 3, then onto switch 2, and then finally to switch 1, being the switch indicated by the destination address of the message. Within preferred embodiments of the invention switch 1 then forwards the congestion information received in the BCN message to its associated network router 22, in this case the router 1, in congestion feedback message 44. In FIG. 4 the BCN message is shown being passed from switch to switch as message 42.

Figure 5:
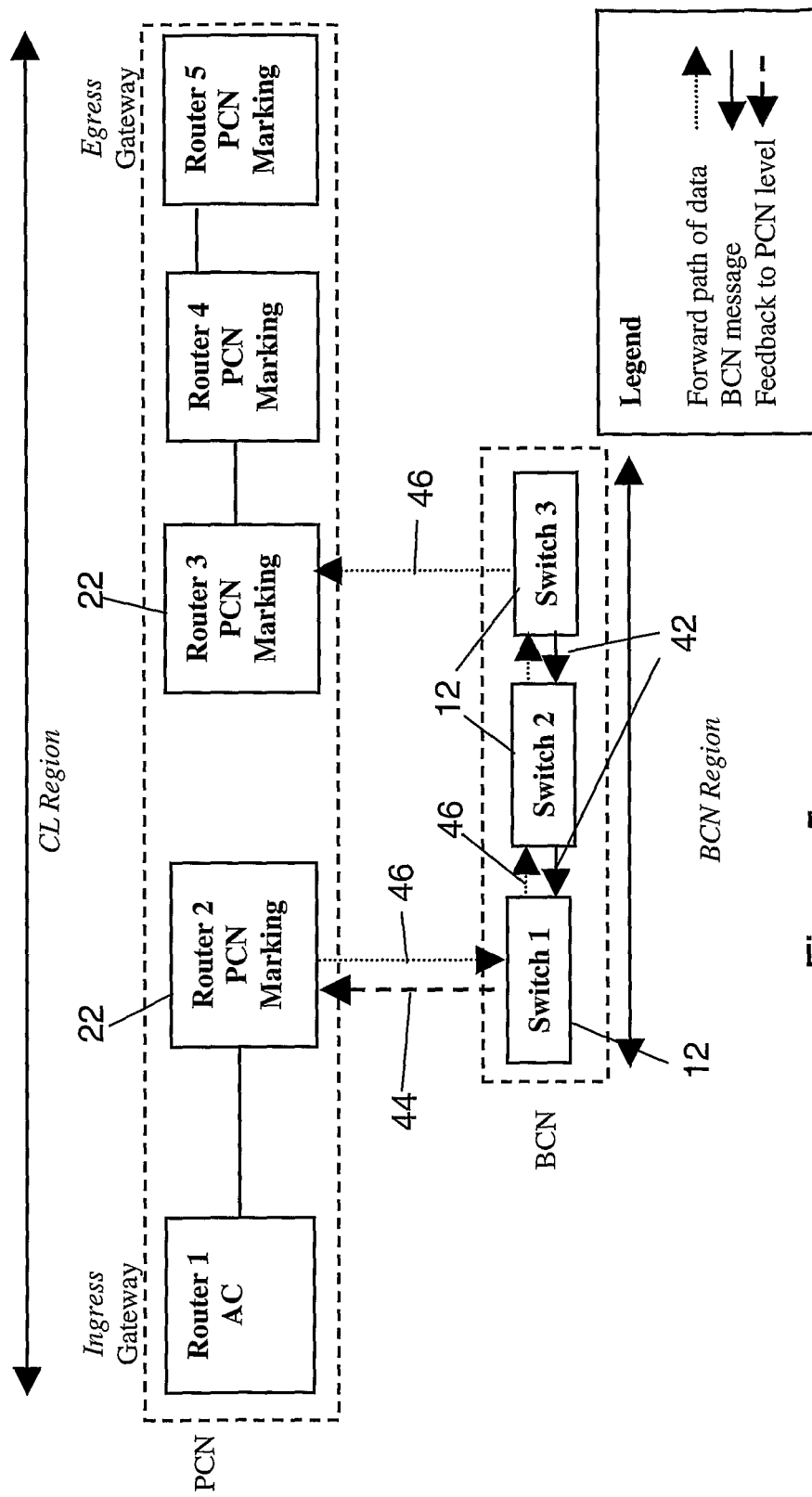
FIG. 5 is a block diagram illustrating the network elements and data flows in a second embodiment of the present invention.

Embodiments of the invention are not limited to passing congestion information from the data link layer to ingress routers in the network layer, as additionally such feedback can also be performed between intermediate routers in the network. This is shown in another embodiment of the invention, illustrated in FIG. 5. Here, the intermediate router 22, router 2, is forwarding a data flow 46 to router 3 in the network layer. All of the routers in the network layer undertake congestion marking such as PCN marking, in a manner conventionally known. At the data link layer, the packet flow 46 is encapsulated into the data link layer frames, and transmitted between router 2 and router 3 by data link layer switches 1, 2 and 3, shown as reference numeral 12. The data flow is shown by arrows 46. In this case, if congestion is experienced in the data link layer at switch 3, then a BCN message is formulated in the manner described previously, or to be described further later, and sent backwards upstream with respect to the flow to the switch 1 associated with intermediate router 2. Again, the congestion information thus obtained from the data link layer is fed back up to the network layer in the form of congestion information 44 passing from the switch 1 to the intermediate router 2.

Moreover, in further embodiments the congestion information in the data link layer can come from a switch which is not located at the same node as a layer 3 router, but is instead an intermediate switch (e.g. switch 2 or switch 3 in FIG. 4) between router nodes.

Within both the first and second embodiments, it should be noted with respect to the data link layer that the BCN mechanism within the data link layer would not typically act upon the received BCN congestion information by adapting its sending rate, in accordance with the usual BCN mechanism. The reason for this is that within preferred embodiments of the invention the main mechanism to be used for combating congestion in the network is the layer 3 PCN mechanism. Thus, in the data link layer the functionality required by preferred embodiments of the invention is to pass on the BCN congestion information up to the associated router in the network layer. Within the network layer the router receives the fed back BCN information, and then uses the BCN congestion information to determine congestion marking, and in particular PCN marking, of IP packets in the network layer. Further information as to how the congestion information from the data link layer obtained via BCN is used to perform congestion marking in the network layer, and in particular PCN marking, will be given later.

In other embodiments, however, the BCN congestion information could also be acted upon in addition at the data link layer, as well as in the network layer. In such a case, the data link layer network element would react to the BCN congestion information by adapting its sending rate in the manner described previously with respect to the conventional BCN mechanism. In such a case the network layer would in addition also perform the PCN congestion control mechanism, thus giving the whole network two simultaneous congestion control mechanisms, one in layer 2, and another in layer 3.

Figure 6:
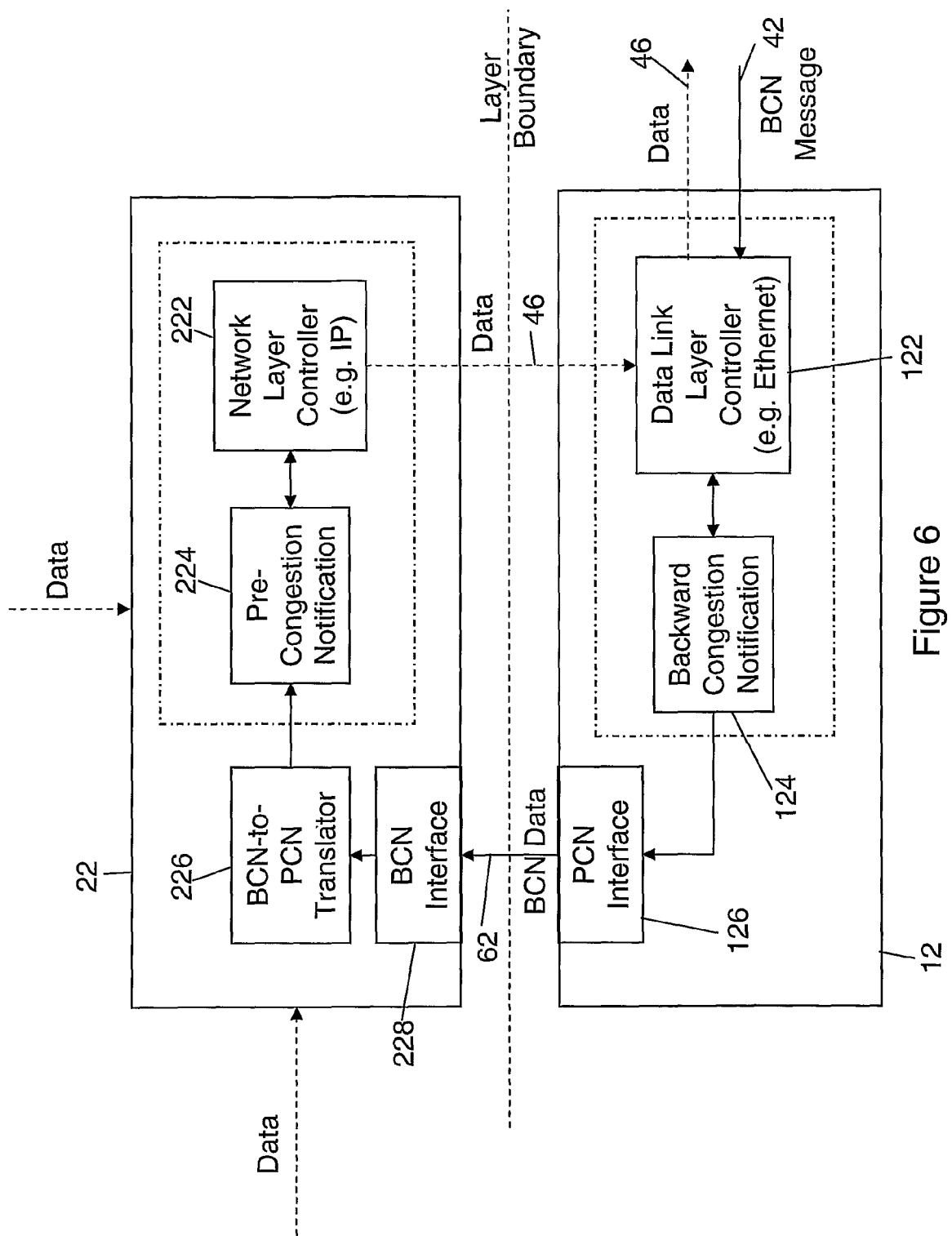
FIG. 6 is a block diagram illustrating a data link layer switch, and a network layer router as used in embodiments of the present invention.

FIG. 6 is a block diagram illustrating the elements inside a data link layer switch and a network layer router in order to operate according to a preferred embodiment. More particularly, addressing the data link layer switch 12 first, the data link layer switch 12, which may be an Ethernet switch or the like, comprises a data link layer controller 122, together with a backward congestion notification (BCN) controller element 124. The data link layer controller 122 controls the data link layer switch 12 to perform its conventional data link layer functions, being typically to transmit data on a point to point link (such as in PPP), or over a broadcast link (as in Ethernet) but to ensure that it gets to the addressed station. Within the data link layer data is typically transmitted in frames, such as, for example, Ethernet frames. Error correction and acknowledgements are typically used as part of the data link layer. As shown, the data link layer controller 46 receives data to be transmitted from the network router 22, and would act to queue such data in a data link layer queue (not shown) and then transmit it on the appropriate line to a next hop switch. In accordance with the BCN mechanism of the prior art, the data link layer switch 12 also receives BCN messages 42, which are passed to the backward congestion notification controller element 124. In preferred embodiments the backward congestion notification element 124 would not then control the transmission rate in response in the manner described previously, but instead simply passes the BCN congestion information to the PCN interface 126.

In other embodiments, however, the data link layer switch 12 may perform its data link layer functions under the control of the controller 122, and also engage in the BCN mechanism as controlled by the BCN controller element 124, as discussed previously.

Whether or not BCN rate adaptation is performed, preferred embodiments provide the additional PCN interface 126 which forwards the BCN congestion information in the form of BCN data 62 to the network router 22. The forwarded congestion information may be an entire received BCN message, or may instead by the congestion value $e_i$ contained within the BCN message. Other elements can of course be forwarded. The provision of the PCN interface 126 in embodiments of the invention therefore characterises the embodiments with respect to a conventional data link layer switch 12, in that this provides an element which forwards the data link layer congestion information up to the network layer.

Turning now to the network router 22, this comprises a network layer controller 222, which controls the network router to perform its conventional network layer functions (typically routing and QoS control). Additionally provided is a pre-congestion notification element 224, which interacts with the network layer controller 222 to perform conventional pre-congestion notification control functions, such as pre-congestion notification marking, and, in the case of ingress and ingress routers, acting upon the receipt of PCN marks or messages generated in response thereto, so as to perform admission control, or flow pre-emption. In accordance with preferred embodiments, however, the network router 22 is further provided with a BCN interface 228, which receives the BCN data 62 containing the congestion information from the data link layer, and forwards it to a BCN-to-PCN Translator 226. The BCN-to-PCN Translator 226 acts to translate the received data link layer congestion information into the context of PCN, and decides how PCN marks should be applied to IP packets in the network layer in dependence on the received data link layer congestion information. Further information as to how this translation can be performed will be given later. In the meantime, having translated the data link layer congestion information into the context of PCN and decided upon suitable PCN marks to be applied, a control signal is passed to the pre-congestion notification element 224 indicating the PCN marking that should be made in response to the received data link layer congestion information. The pre-congestion notification information 224 then acts upon this received control signal, so as to mark packets accordingly.

Figure 7:
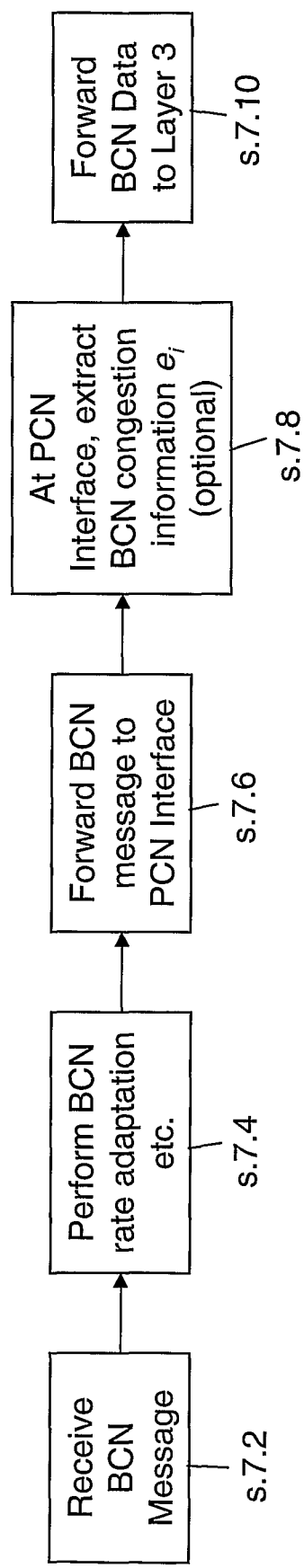
FIG. 7 is a flow diagram illustrating the steps involved in embodiments of the present invention.
Figure 8:
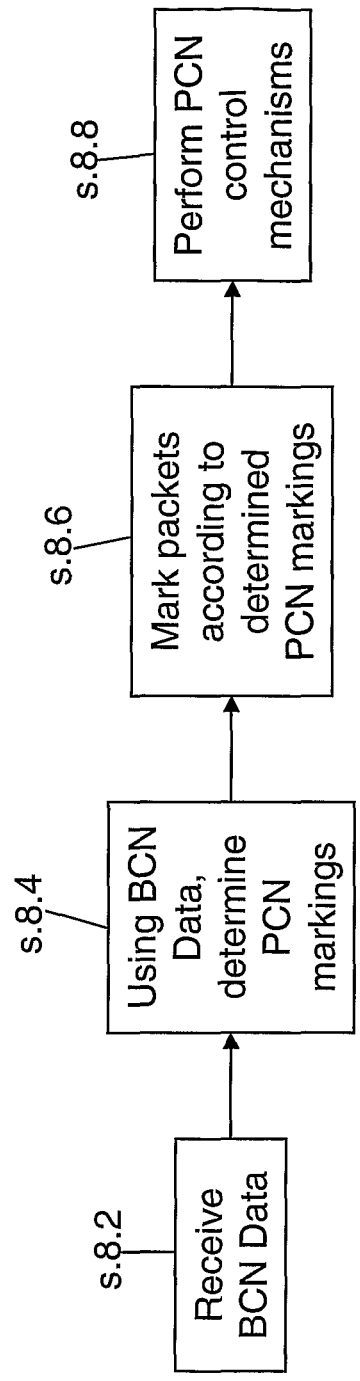
FIG. 8 is a flow diagram illustrating the steps involved at a router in embodiments of the present invention.
Figure 9:
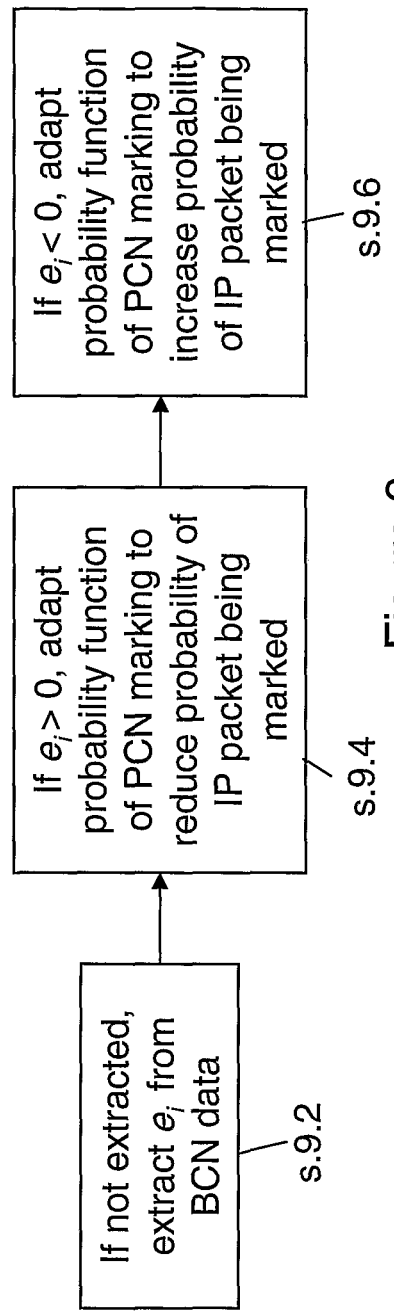
FIG. 9 is a flow diagram illustrating the steps involved to translate BCN information to PCN marking in a preferred embodiment of the present invention.

FIGS. 7 and 8 respectively illustrate the steps performed by the data link layer switch 12, and the network router 22, in forwarding the data link layer congestion information, and then translating it into PCN marking. More particularly, FIG. 7 illustrates the steps performed by the data link layer switch 12. Firstly, assume that the data link layer switch 12 has forwarded a data flow onwards on its outward data links towards the next hop router, via a series of data link layer switches. At one of the downstream switches congestion is experienced, and a BCN message generated and transmitted as will be discussed in more detail later. At step 7.2, the data link layer switch 12 receives the BCN message, and assuming that the destination address shown in the BCN message corresponds to the address of the data link layer switch 12 in issue, at step 7.4 the backwards congestion notification controller element 124 parses the received BCN message to determine the congestion information value $e_i$. The backwards congestion notification controller element may then perform the BCN rate adaptation according to the additive increase multiplicative decrease algorithm as is conventionally known, although as mentioned this is not preferable. Thus far, however, the operation of the data link layer switch 12 is conventional.

However, according to some embodiments the congestion information embodied by the BCN message is to be forwarded up to the network layer router associated with the switch, and hence to achieve this the BCN message is forwarded to the PCN interface 126, at step 7.6. At the PCN interface, depending on what information is to be passed up to the network layer, the PCN interface may extract the BCN congestion information $e_i$ if only this information is to be transmitted as the BCN data 62. However, in other embodiments the entire message may simply be forwarded as the BCN data. Whatever format the BCN data therefore takes (i.e. the congestion information $e_i$, or the BCN message as a whole) the BCN data is forwarded to the network layer at step 7.10. Within some embodiments no further additional activity over and above conventional activity is then undertaken by the data link layer switch 12.

FIG. 8 illustrates the steps involved at the network router 22, upon receipt of the BCN data forwarded from the data link layer. In particular, at step 8.2 the BCN data 62 is received, at the BCN interface 228. BCN interface 228 may optionally, if not performed by the PCN interface 126, and if required, strip out the congestion information $e_i$ from the BCN message. This step is performed if an entire BCN message has been received, but only the congestion information $e_i$ is required. This is an optional step, however, and instead the BCN interface 228 may simply forward the received BCN data 62 to the BCN-to-PCN translator, depending upon the particular deployment. At the BCN-to-PCN Translator 226 the BCN data is used, at step 8.4, to determine the PCN markings that will be applied to IP packets in the network layer. How this determination is performed will be described in more detail later, and there are several different methods which may be used. The BCN-to-PCN Translator 226 determines what PCN marks are to be applied, and passes control information to the pre-congestion notification element 224. At step 8.6 the pre-congestion notification element 224 then PCN marks the IP packets in response to the control information, using the conventional marking protocols for PCN. Having marked the packets, the pre-congestion notification controller element 224 then performs the conventional PCN control mechanisms, which can include admission control, or flow pre-emption.

Thus, the effect of these embodiments is to add in to the network layer additional congestion marks in dependence on the congestion information received from the data link layer. Moreover, these congestion marks are preferably, in the embodiments described here, PCN marks. In other embodiments different types of congestion mark, such as ECN marks, may be used. How the network layer then reacts according to these additional congestion marks then depends upon the conventional congestion control algorithms being used. In the case of PCN marks, the conventional admission control and flow pre-emption algorithms employed by PCN may be used.

Thus, in the embodiments described thus far, congestion information is taken from a lower layer and fed up to a higher layer. Congestion marking is then performed in the higher layer, in dependence on the congestion information received from the lower layer. The congestion marking is preferably PCN marking, although ECN marking is also envisaged. As described, the lower layer is preferably the data link layer, and the higher layer is preferably the network layer. Within the lower layer, the congestion information has been generated at a downstream switch, and fed backwards to an upstream switch, prior to then being fed into the high layer. Such mechanisms allow the early detection of congestion which can occur in the data link layer to be fed into the network layer, where action can then be taken to avoid congestion of the network. Such actions can include the PCN functions of admission control, and, if necessary, flow pre-emption.

There are several mechanisms as to how the congestion information received from the lower layer can be translated into congestion information for use in the higher layer. Several possibilities include the following:—

1. Each individual BCN message received in the higher layer gets translated into a PCN mark in a single IP packet. Whilst straightforward, such a mechanism does not take into account the relative sizes of IP packets used in the network layer, and typical data frame sizes used in the data link layer. In particular, an IP packet can be several times the size of a data frame. Therefore, if a single BCN message is generated per data frame, and this has to translate into a marking on a corresponding IP packet, then due to the much larger size of IP packets compared to data frames (such as Ethernet frames) then much more data in terms of the payloads carried in the IP packets would be congestion marked then is actually suffering congestion in the data link layer.

2. In order to overcome the above problem, N BCN messages may be translated into M PCN marks. Thus, for example, for every three BCN messages which are received, one IP packet may be PCN marked. Here, it may be useful to assume average data frame and packet sizes, so as to be able to determine a ratio of how many BCN messages should be translated into a single PCN mark. Alternatively, the largest frame and packet sizes could be assumed. In such a case, taking Ethernet and IP as an example, an Ethernet frame has a maximum payload of up to 1,500 bytes, whereas the maximum length of an IP datagram is 65,535 bytes. Assuming maximum sizes for packets, and assuming a BCN message for every data frame, then approximately 40 BCN messages would be translated into a single PCN mark. Typically, however, IP datagrams are much smaller than the maximum permitted size, so as to avoid fragmentation when transmitted over a data link layer such as Ethernet. Usually, therefore, a much lower ratio may be used, in the region of 3 to 15, depending on the deployment. In another embodiment, instead of keeping an absolute count of the number of BCN messages received, and then doing a PCN mark once a threshold is reached, IP packets could be PCN marked with a probability according to the ratio i.e. if the ratio is 3 to 1, then for every BCN message which is received, an IP packet is PCN marked with a probability of 33%. In a further embodiment, when a BCN message arrives, if this message tells you the size of the Layer 2 (data link layer) frame that caused congestion at the downstream switch, then this size may be added to a counter. Then, when the counter is greater than the size of the network layer packets, a network layer packet is marked, and the counter is decremented by the size of the marked packet. In all of the above mechanisms, one of the aims is to try and have the same amount of payload data marked as congested in the network layer as is actually suffering congestion in the data link layer.

3. A third option is to PCN mark a present IP packet in the router with a probability depending on the congestion value $e_i$ received in a presently received BCN message.

4. A further option is to have the probability of marking a present IP packet dependent on the congestion value $e_i$ in recent BCN messages, with the value $e_i$ subject to a smoothed average.

5. Additionally, a decision may need to be made as to whether the PCN mark is an admission mark or a pre-emption mark. Typically, and in the methods noted above, the PCN mark would be an admission mark, rather than a pre-emption mark, for the reason that pre-emption marks would typically be used when the network has undergone a serious router or link failure. A further technique is therefore to admission mark or pre-emption mark a present IP packet in dependence on the congestion value $e_i$ received in either a present, or recent BCN message. For example, if the received congestion value $e_i$ is very high, then the PCN mark applied to a present packet may be a pre-emption mark, rather than an admission mark. Inherent in such a technique is implied a first threshold value for the congestion value $e_i$, over which pre-emption marks are used, and under which admission control marks are used. Additionally, it is also possible to set a second, lower, threshold value for the congestion value $e_i$, under which no PCN marks are made.

6. BCN also provides for the sending of "stop" messages in addition to messages containing the congestion value $e_i$. If a BCN stop message is received at the data link layer switch 12, then at the network layer the BCN stop message may be interpreted such that a pre-emption mark is applied to an IP packet. Thus, whenever a BCN stop message is received, the present IP packet is pre-emption marked.

7. Additionally, it will be preferable to PCN mark packets that go through the specific congested switches in the data link layer. In this respect, a network router can be connected to several data link layer interfaces. In order to take this into account, the PCN layer can be further arranged to note which data link layer interface a frame gets sent on, which then subsequently causes a BCN message to be received on that interface. PCN then marks the next IP packet going out on this specific Ethernet interface. Such a technique helps to target those flows which are being transported over particular congested data link layer links.

8. A further technique is to set the probability of marking a present IP packet in dependence on the congestion value $e_i$ received in a presently received BCN message, and on the length of the virtual queue maintained in the network router. This method is discussed further below with respect to FIG. 9, and FIGS. 10 to 13.

Figure 3:
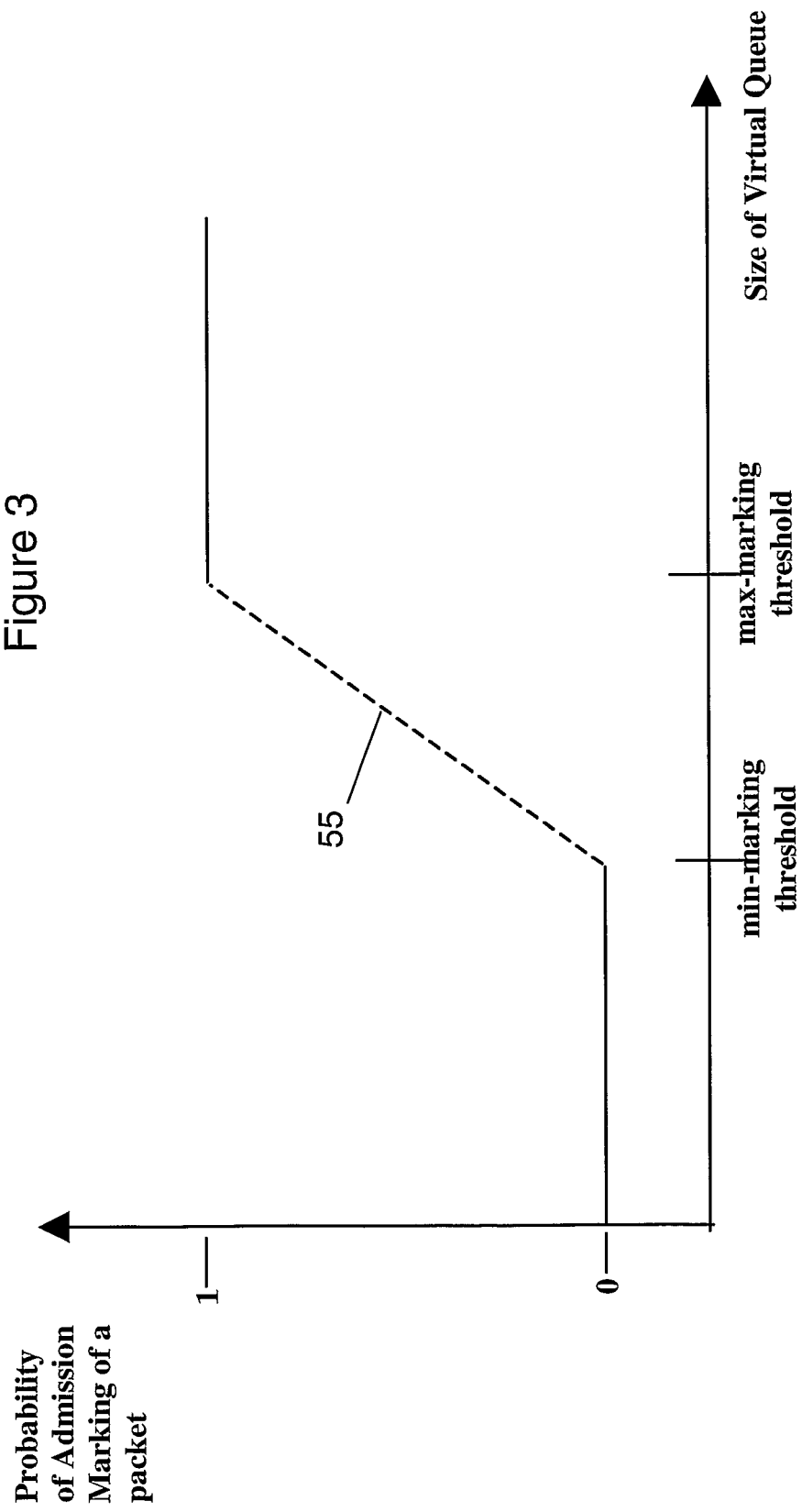
FIG. 3 is a diagram illustrating the probability function of an IP packet being admission marked using PCN of the prior art.

More particularly, according to this particular technique, the BCN-to-PCN transmitter 226 maintains a probability function which defines the probability of a particular IP packet being PCN marked, typically by being admission marked. Such a probability function was discussed previously with respect to FIG. 3, which illustrates that the probability increases linearly between 0 and 1 between a minimum marking threshold and a maximum marking threshold, in dependence on the size of the virtual queue in the network router. In order to increase or decrease the probability of a particular IP packet being admission marked, the probability function is altered in dependence upon the congestion value $e_i$.

Figure 12:
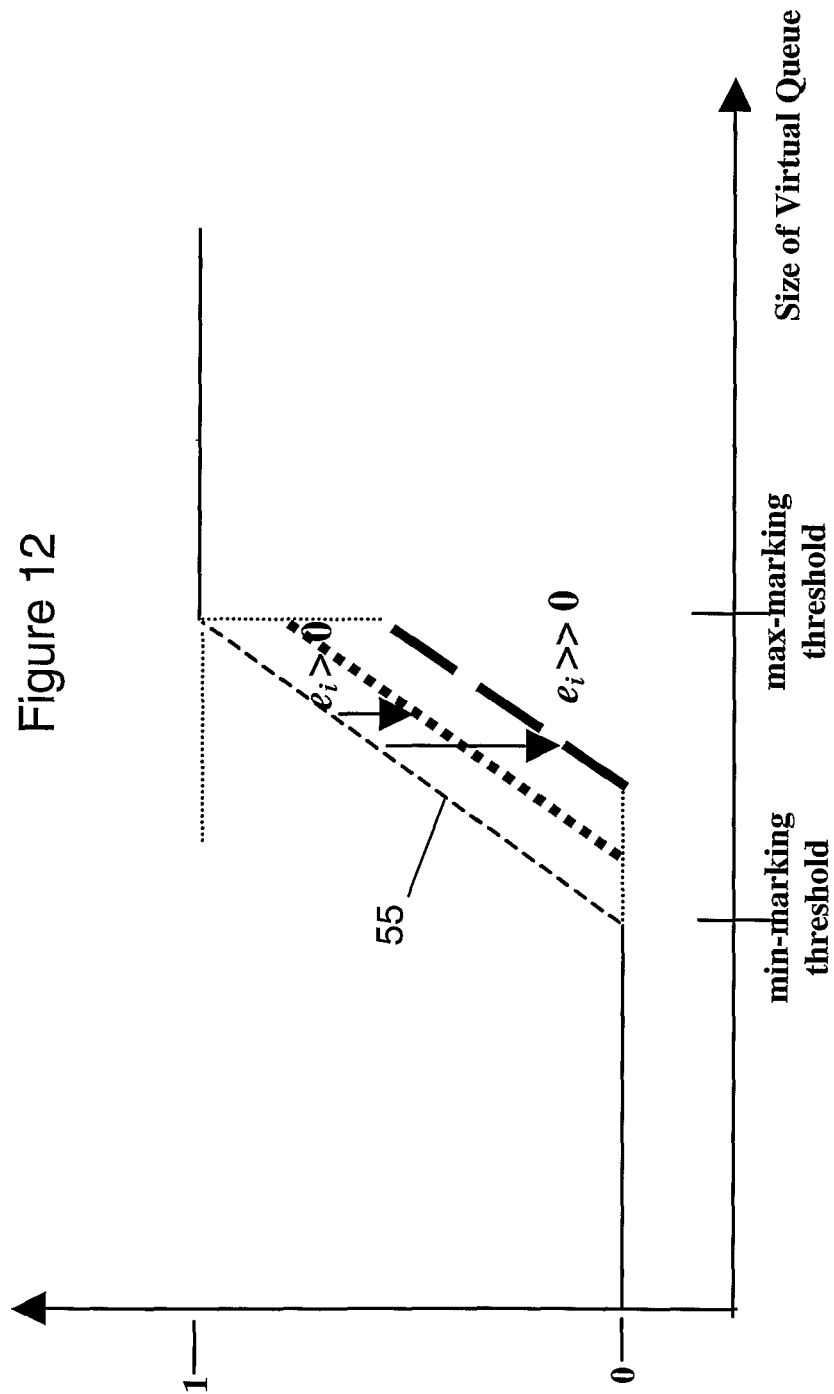
FIG. 12 is a diagram illustrating a probability function of admission marking a packet in an embodiment of the invention.

More particularly, at step 9.2 the BCN-to-PCN Translator 226 extracts the congestion value $e_i$ from the BCN data 62 received at the BCN interface 228, if, that is the congestion value $e_i$ has not already been extracted. Then, at step 9.4 if the congestion value $e_i$ is greater than 0, the probability function of PCN marking is adapted so as to reduce the probability of an IP packet being marked. How such adaptation can occur is shown, for example, in FIGS. 12 and 13. In particular, FIG. 12 shows one particular way how the probability function can be adapted. Here, the probability function 55 is adapted such that the probability curve is moved vertically downwards. The extent of the downward movement being dependent upon the value of $e_i$. In particular, for a certain range of values of $e_i$ over 0 the probability function is moved down a certain amount, whereas if $e_i$ is much greater than 0, then it is moved downwards an even greater amount. The relationship between the degree of downward movement of the probability curve and the value of $e_i$ may be linear, exponential, or subject to any continuous or discontinuous function. However, it is preferable that the greater the value of $e_i$ the less the probability of an IP packet being marked.

FIG. 13 illustrates an alternative mechanism of reducing the probability, in terms of moving the probability curve to the right, the amount of movement again being dependent upon the value of $e_i$, with a greater movement for a higher value. Here, the min marking thresholds and max marking thresholds are not changed resulting in a probability function which is similar to FIG. 12. In another embodiment, the thresholds themselves may also be altered, so as to increase their values. Thus, when the congestion value function is greater than 0, by increasing the thresholds the virtual queue would have to be larger for marking to occur. Of course, any combination of such techniques can be employed, the general criteria being that the probability of an IP packet being admission marked decreases when the congestion value $e_i$ increases. The relationship between the probability and the congestion value $e_i$ may be deployment specific.

Figure 10:
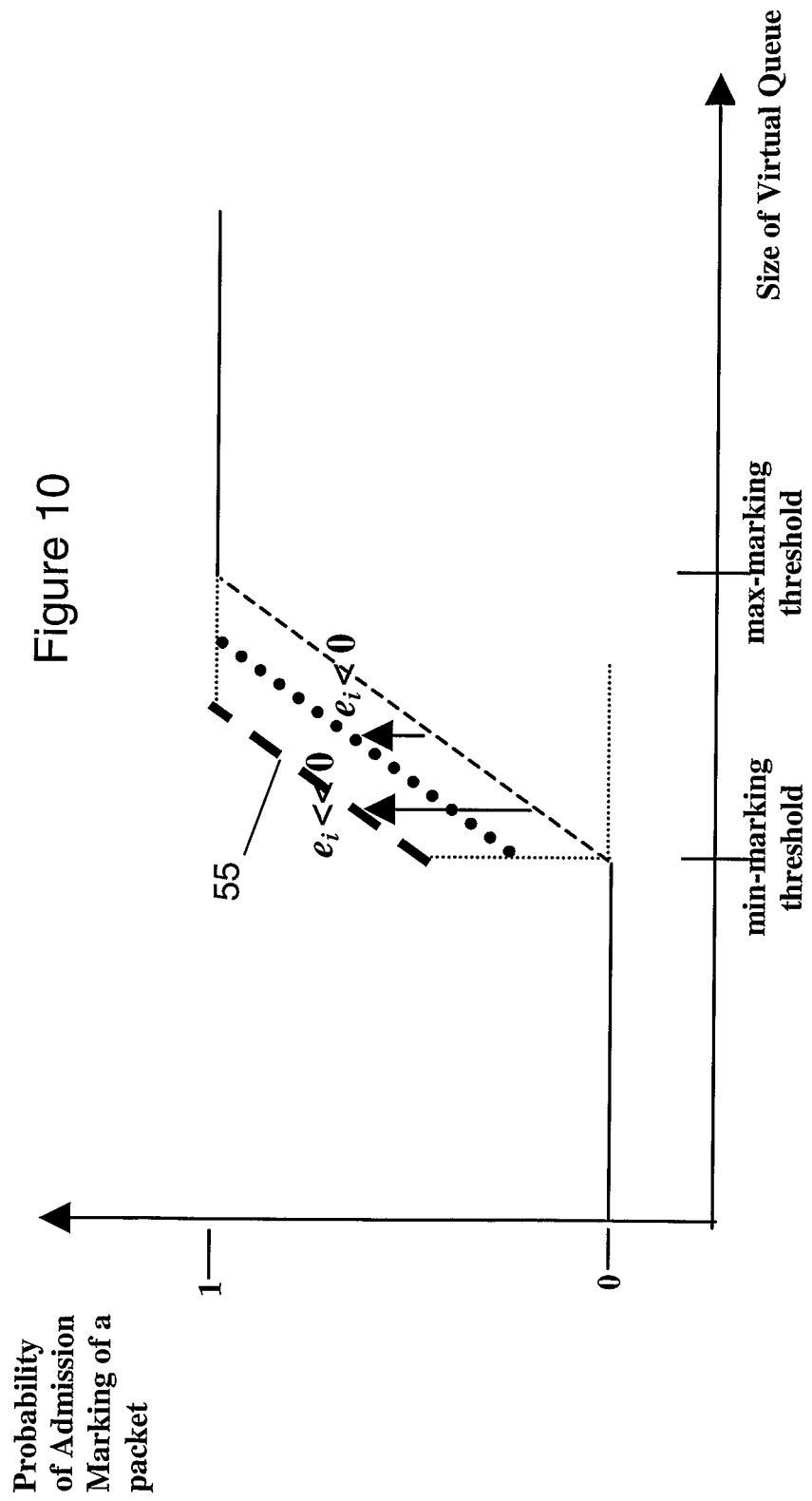
FIG. 10 is a diagram illustrating the probability function of admission marking a packet in an embodiment of the present invention.
Figure 11:
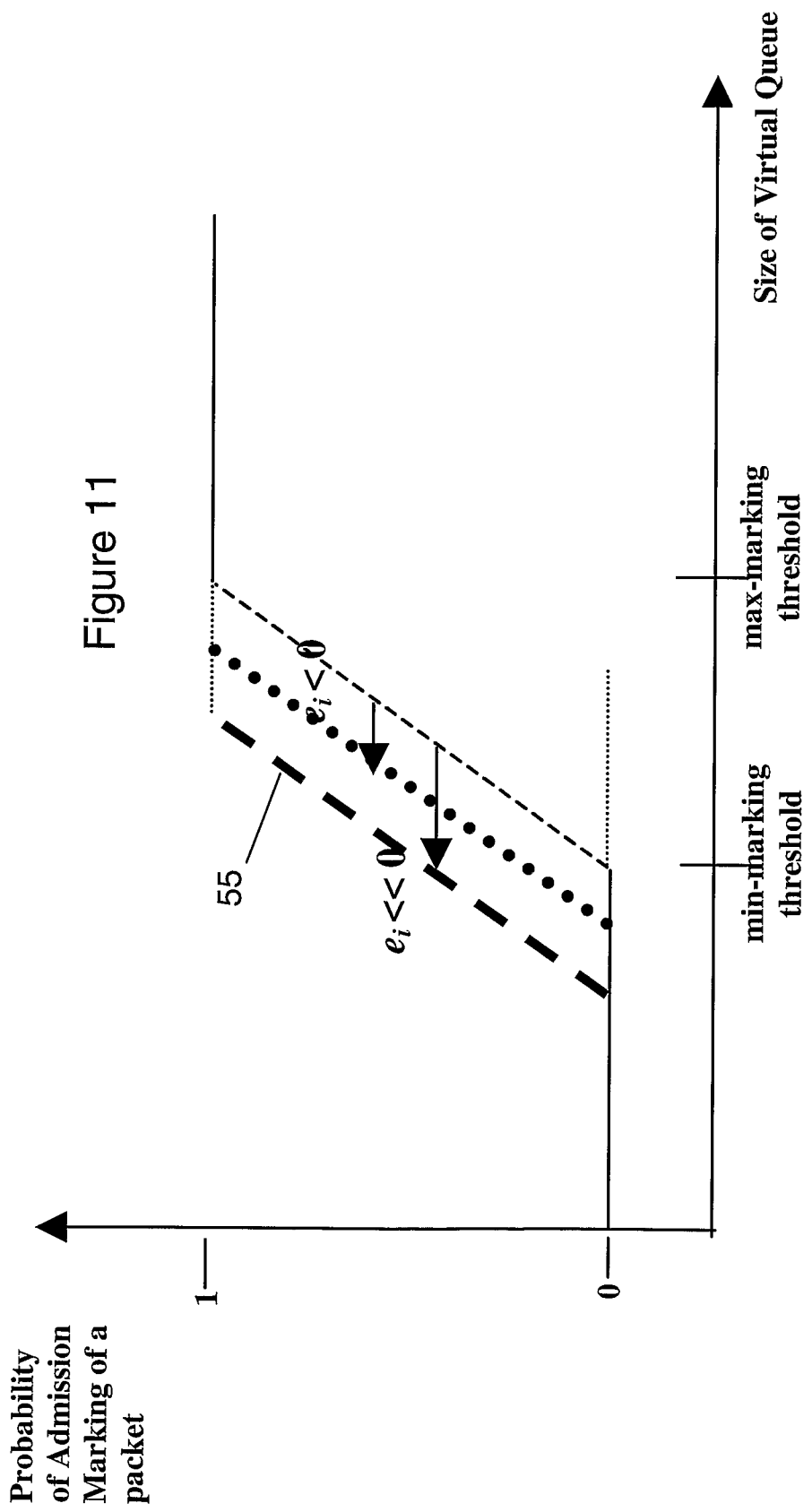
FIG. 11 is a diagram illustrating the probability function of admission marking a packet in an embodiment of the invention.

Returning to FIG. 9, at step 9.6 it is determined that if the congestion value $e_i$ is less than 0, then the probability function of PCN marking should be adapted to increase the probability of an IP packet being marked. FIGS. 10 and 11 show two mechanisms as to how this can be achieved, either by moving the probability curve upwards, as shown in FIG. 10, or to the left, as shown in FIG. 11. It will be appreciated that the movements in FIGS. 10 and 11 are the opposite to those shown in FIGS. 12 and 13 respectively, and hence the same options for implementation apply here. More particularly, the probability curve may be moved either upwards or to the left to a greater extend for a lesser value of $e_i$, in that where $e_i$ is much less than 0, the probability curve is moved to its greatest extent. Additionally, the relationship between the degree of movement of the probability curve 55 and $e_i$ may linear, exponential, or any continuous or discontinuous mathematical function. The general requirement is, however, that the lower the value of $e_i$, the less probability of any IP packet being admission marked.

Additionally, the min marking threshold and max marking threshold may be reduced, which would also have the effect of increasing the probability of markings, as a smaller virtual queue would be required for marking to occur.

A specific example illustrating how the probability function may be implemented and presented by way of example only is given below.

As previously described, the $e_i$ value is derived from Qoff and Qdelta. Given Qoff and Qdelta are typically made up of 16 bits each, that means $e_i$ can be a maximum of 65535 (in dec) and FFFF (in hex). Therefore, the range of $e_i$ value is from −65535 to 65535.

An example of how we can configure the implementation using the $e_i$ value is described here. The $e_i$ value of 65535 will have a marking probability of 0 and $e_i$ value of −65535 will have a marking probability of 1. We can set a marking probability of 0.5 when $e_i$ value is 0. An $e_i$ value of −32768 will yield a marking probability of 0.75 and an $e_i$ value of 32768 will yield a marking probability of 0.25.

As an example, it then becomes possible to set the system to pre-emption mark a packet when the $e_i$ value is −32768 or less, and to admission mark the packet when the $e_i$ value is 0 or less.

We shall turn now to a discussion of how the BCN message is generated in the upstream switch within the presently described embodiments of the invention, and in particular on how the lower layer congestion information is derived.

Within the present description of preferred embodiments of the present invention we have described how congestion information from a downstream layer 2 node is fed back to an upstream layer 2 node using "BCN" messages. In this respect, we use messages in the 802.1Q format described previously within the presently described embodiments because the format of such messages are widely used, hence allowing for wide uptake of embodiments of the present invention. In particular, however, within the described embodiments we specify the BCN type of 802.1Q tag message because it already contains suitable fields for communicating congestion information, in the form of the congestion value $e_i$. In other embodiments, however, different message formats may be used.

With respect to the congestion value $e_i$, within the described embodiments of the invention this value may be calculated in various ways, as described next.

Firstly, as noted previously, the congestion value $e_i$ may be calculated in exactly the same manner as described previously with respect to the prior art BCN mechanism, applying the equations given in Equations 1 and 2 previously. However, these equations act upon values taken from the actual traffic queue at the switch, and in particular use the instantaneous traffic size q(t), as well as the actual sending rate qd. By looking at values of the actual traffic queue, whilst an indication of congestion can of course be obtained from such values, such an indication tends to be obtained only as or after congestion has occurred, and may therefore too late to prevent any congestion. Thus, whilst within preferred embodiments of the invention the congestion value $e_i$ may be calculated using these equations and looking at values of the actual traffic queue, this is not preferable.

A more preferable technique, therefore, is to make use of a "virtual queue" at the downstream switch, to make a determination as to whether congestion is about to occur. As described previously, a "virtual queue" is a simulation of the size of the actual queue, where a number is maintained representing the virtual queue size, the number being incremented at the same rate as packets arriving in the actual queue. However, the number is decremented at a slower rate than packets are actually transmitted from the switch, and hence depart from the actual queue. For example, the virtual queue may be decremented at, a rate which is, say, 80% of the actual sending rate from the real queue. The effect of this is to provide, for a given arrival rate of packets, a higher level of virtual queue occupancy than real queue occupancy, and allow for potential congestion to be detected before congestion has actually occurred.

Within preferred embodiments of the present invention, therefore, the layer 2 switches also maintain a virtual queue in addition to the real queues, applying a decrement rate to the virtual queue which is some percentage less than 100% of the actual sending rate used by the switch. For example, a decrement rate of 80% of the actual sending rate may be used. This is equivalent to applying a virtual queue sending rate coefficient V of value <1 to the actual sending rate used by the switch. Thus, V=0.8 would give an 80% sending rate for the virtual queue. Other values can of course be used, as a matter of design choice.

To calculate the link layer congestion value $e_i$, similar equations to equation 1 and 2 previously may be used, but instead of using values taken from the real queue, values taken from the maintained virtual queue are used.

More particularly, in preferred embodiments the congestion value $e_i$, consists of a weighted sum of the instantaneous virtual queue offset and the virtual queue variation over the last sampling intervals, applying the lower decrement (sending) rate of the virtual queue, as shown in Equation 3 below:

$$e_i = q_{off}(t) - Wq_{delta}(t) = (Qeq - q_v(t)) - W(q_a - Vq_d) \qquad \text{Eq. 3}$$

where W is the weight; V is the virtual queue sending rate coefficient and is less than 1; $q_{off}(t)$ is the instantaneous queue offset defined as $$q_{off}(t) = q_v(t) - Q_{eq} \qquad \text{Eq. 4}$$

and $q_{delta}$ is the queue variation over the last sampling interval and is defined as the difference in the number of packets that arrived $q_a$ and the number of packets that were deemed served $Vq_d$ from the virtual queue since the last sampling event. Here, $q_v(t)$ is the instantaneous virtual queue size, and Qeq is the equilibrium virtual queue size, which would typically be half the maximum size of the virtual queue. Usually, the maximum size of the virtual queue would be the same as the maximum size of the real queue.

By using values taken from the virtual queue, which "empties" at a slower rate than the actual queue, to calculate the lower layer congestion information $e_i$ the value of $e_i$ will indicate more congestion in the switch than is actually occurring, but more importantly will provide an earlier indication of congestion build-up than simply looking at the real queues.

Thus, using a congestion value which is calculated in dependence on the properties of a virtual queue can allow for earlier pre-congestion action to be taken than would otherwise be the case.

Whether the congestion value is calculated using the virtual queue, as in the preferred embodiments, or using the real queue, as mentioned the value is placed into an 802.1Q tag message preferably of the BCN type discussed previously for sending to the upstream switch which is the source of a congesting flow.

In conclusion, therefore, preferred embodiments of the present invention provide a technique whereby congestion information from a lower layer such as the data link layer can be incorporated into a congestion mechanism for a higher layer, such as network layer. Detecting congestion information in a lower layer can be more convenient, and may also provide for congestion to be detected earlier, and action to be taken in the network layer at an earlier point, to prevent congestion occurring perhaps at all.

Further modifications, variations, arrangements which use the underlying inventive concept and fall within the spirit and/or scope of the invention will be apparent to the skilled person to provide further embodiments, any and all of which are intended to be encompassed by the amended claims.

The invention claimed is:

1. A method of congestion marking in a data network using a protocol stack,
the method comprising: receiving, at least one upstream network element having a higher layer in the protocol stack, lower layer congestion information communicated via the data network from at least one downstream network element having a lower layer in the protocol stack, the data network being external to the at least one upstream and the at least one downstream network element, the at least one downstream network element being operable to communicate via the data network with the at least one upstream network element using a flow of data traffic,
the lower layer congestion information relating to data traffic congestion occurring at a downstream element in the flow at a lower layer in the protocol stack, the downstream element being within the lower layer;
determining, at said at least one upstream network element, higher layer congestion information to be used in the higher layer, in dependence on the lower layer congestion information; and
performing congestion marking by applying the higher layer congestion information to data traffic forwarded via the data network by an upstream network element in the higher layer.

2. The method according to claim 1 wherein the lower layer is the data link layer, and the higher layer is the network layer.

3. The method according to claim 2, wherein the data link layer congestion information is calculated in dependence on one or more properties of a virtual queue maintained at the downstream data link layer network element.

4. The method according to claim 2, wherein the data link layer congestion information is received in the form of a BCN (Backward Congestion Notification) message.

5. The method according to claim 2, wherein the network layer congestion information are PCN (Pre-Congestion Notification) marks.

6. The method according to claim 5, wherein the PCN marks are admission marks if the data link layer congestion information indicates congestion below a first threshold value, and pre-emption marks above said first threshold value.

7. The method according to claim 6, wherein if the data link layer congestion information indicates congestion below a second threshold value lower than said first threshold value, then no PCN marks are applied.

8. The method according to claim 2, wherein the network layer congestion information is determined in dependence on a probability function with respect to virtual queue size in the network layer element, wherein the probability function is adapted in dependence on the data link layer congestion information.

9. The method according to claim 2, wherein the network layer congestion information is determined in dependence on the data link layer congestion information in such a manner that substantially the same amount of payload data is congestion marked in the network layer as in the data link layer.

10. The method according to claim 1, wherein said applying step comprises performing ECN (Explicit Congestion Notification) marking.

11. The method according to claim 1, wherein said applying step comprises adding ECN (explicit Congestion Notification) marks to forwarded data traffic.

12. The method according to claim 1, wherein the data network includes a plurality of upstream network elements and a plurality of downstream network elements, wherein each said network element is a separate electronic device.

13. A method for congestion marking in a data network, said method comprising:
determining, at a data link layer network element, data link layer congestion information relating to congestion occurring within one or more data link layer links in said network, wherein said network comprises at least one upstream network element and at least one downstream network element, the data network being external to the at least one upstream and the at least one downstream network element, the at least one downstream network element being operable to communicate via the data network with the at least one upstream network element;
passing said data link layer congestion information via the data network to an upstream network layer network element; and
performing congestion marking by applying the congestion information received at said upstream network layer network element to data traffic forwarded via the data network by an upstream network element in a higher layer.

14. The method according to claim 13, wherein said applying step comprises performing ECN (Explicit Congestion Notification) marking.

15. The method according to claim 13, wherein said applying step comprises adding ECN (Explicit Congestion Notification) marks to forwarded data traffic.

16. A method of congestion marking in a data network, the method comprising:
receiving, at a first network layer network element via the data network, data link layer congestion information relating to congestion occurring within one or more lower data link layer links in said network, wherein said network comprises at least one upstream network layer network element and at least one downstream data link layer network element, the data network being external to the at least one upstream and the at least one downstream network element, the at least one downstream network element being operable to communicate via the data network with the at least one upstream network element;

determining network layer congestion information at said first network layer network element in dependence on the received data link layer congestion information; and performing congestion marking by applying said determined congestion information to one or more data packets forwarded via the data network by an upstream network element in the network layer.

17. The method according to claim 16, wherein said applying step comprises performing ECN (Explicit Congestion Notification) marking.

18. The method according to claim 16, wherein said applying step comprises adding ECN (Explicit Congestion Notification) marks to forwarded data traffic.

* * * * *